INVENTORS.
HERSCHEL H. STILLEY
KENNETH S. KORDIK
BY
Wolfe, Hubbard, Voit & Osann
ATTORNEYS.

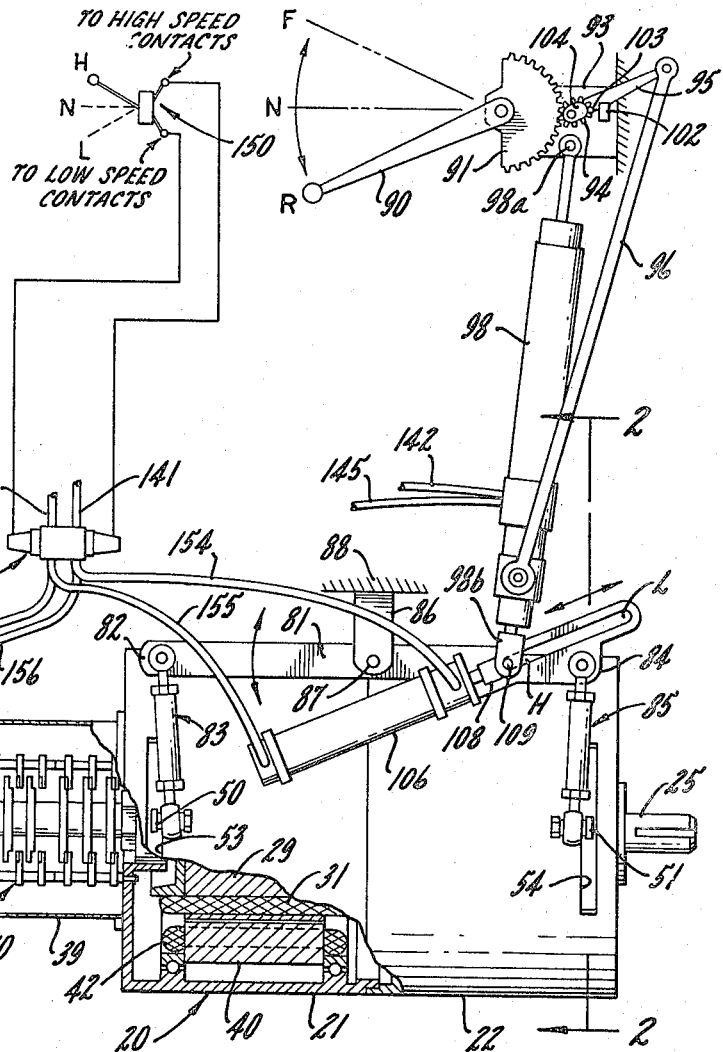

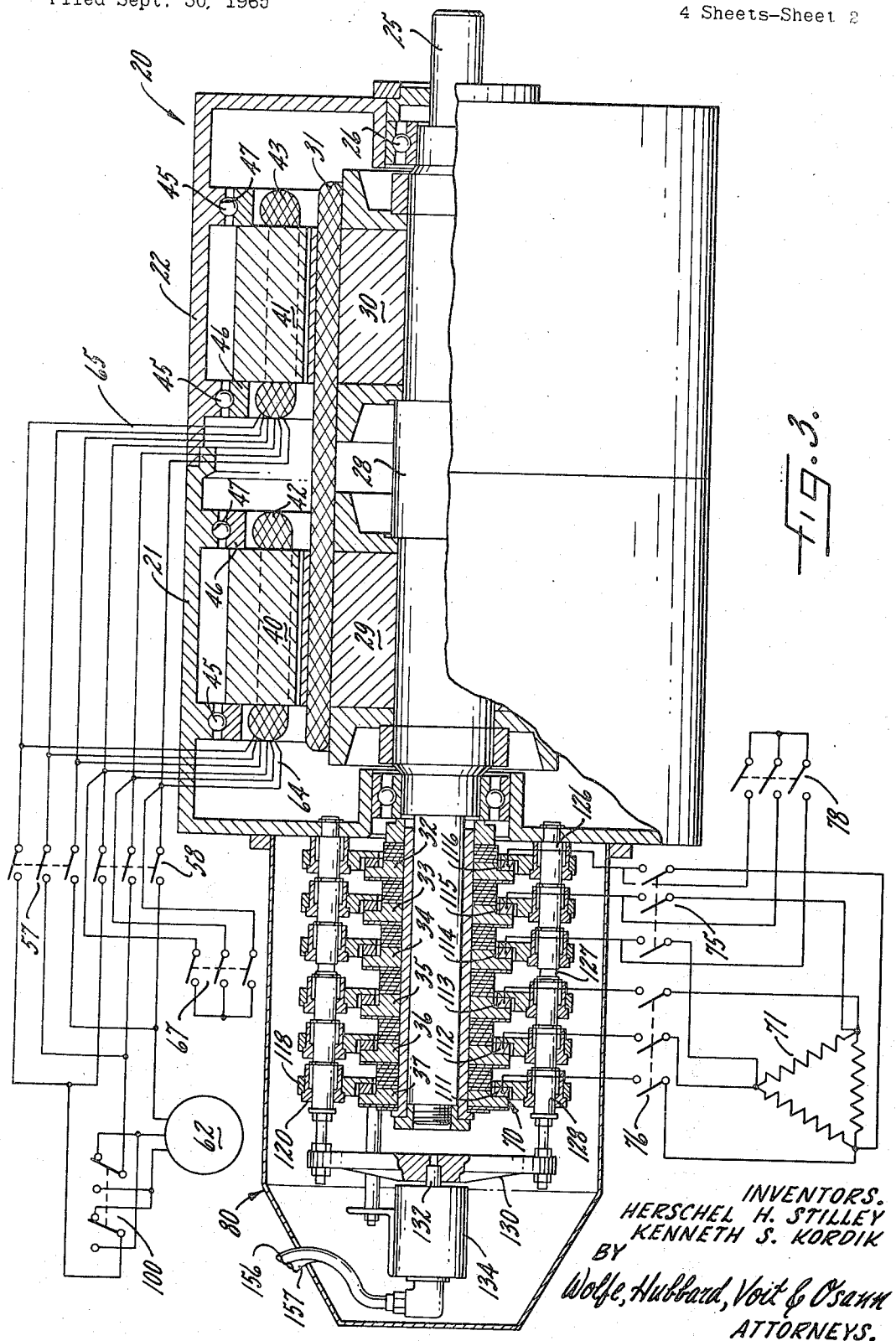

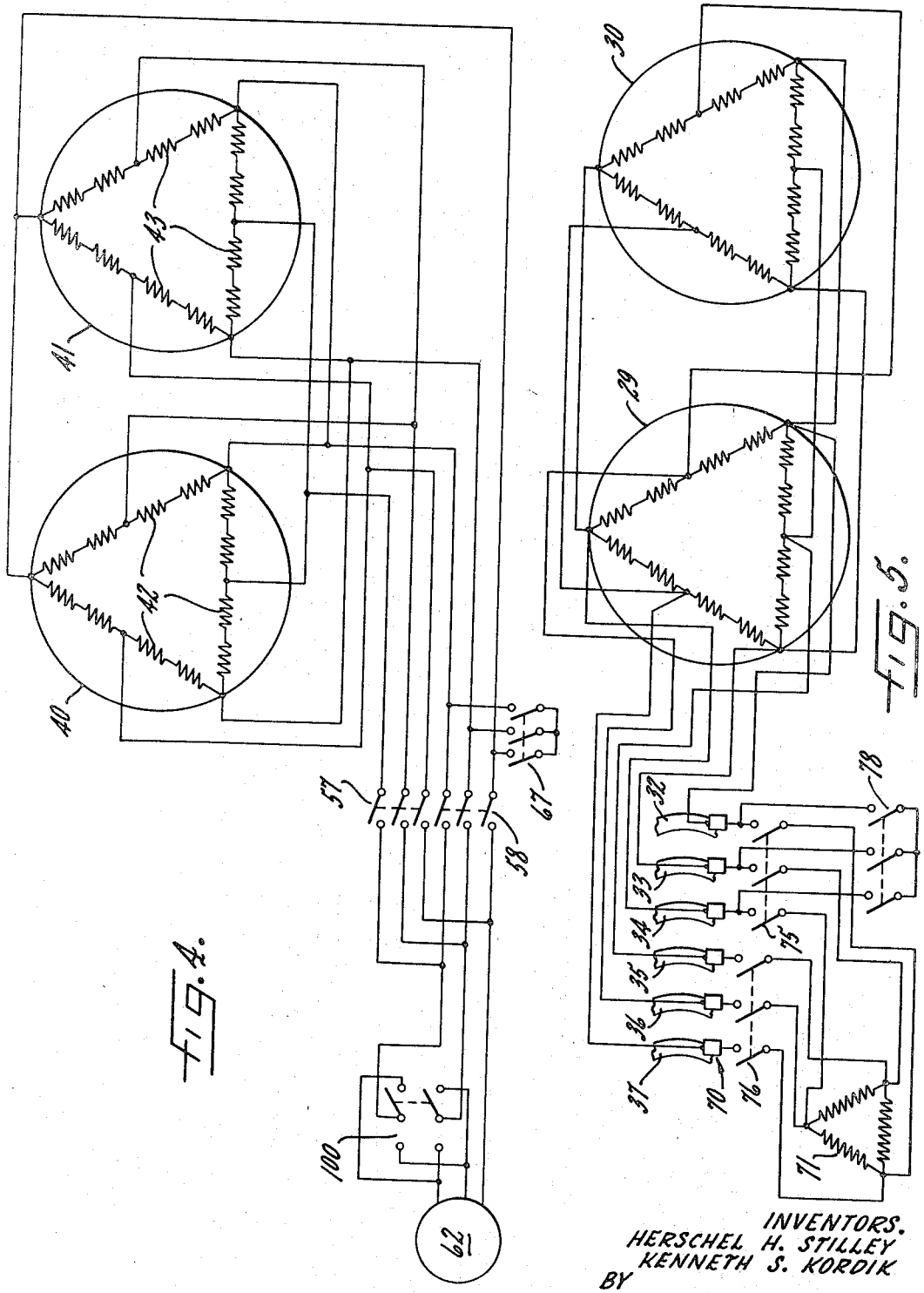

United States Patent Office 3,376,483
Patented Apr. 2, 1968

3,376,483
BRUSH LIFTING MECHANISM FOR
VARIABLE SPEED A-C MOTOR
Herschel H. Stilley and Kenneth S. Kordik, Rockton, Ill., assignors, by mesne assignments, of one-half to Warner Electric Brake & Clutch Company, South Beloit, Ill., a corporation of Delaware, and one-half to Herschel H. Stilley, Rockton, Ill.
Filed Sept. 30, 1965, Ser. No. 491,546
9 Claims. (Cl. 318—214)

ABSTRACT OF THE DISCLOSURE

An A-C motor in which the speed may be changed by varying the number of winding poles including a brush and slip ring arrangement with provision for reducing wear in non-conducting brushes when the motor is switched to high speed operation by moving non-current carrying brushes out of contact with their respective slip rings.

A variable speed A-C motor in which the speed may be changed by varying winding poles with provision for the same mechanism changing the speed of the motor and also moving non-current carrying brushes out of contact with their respective slip rings for high speed motor operation.

---

The present invention relates generally to A-C motors of the type in which the speed may be changed by varying the number of winding poles, and more particularly to an improved brush and slip ring assembly characterized by its ability to substantially reduce wear in nonconducting brushes when the motor is switched to high speed operation.

An A-C motor of the type that may advantageously utilize the apparatus of the present invention is described and claimed in our copending application Ser. No. 458,626, filed May 25, 1965, and assigned to the assignee of the present invention. There is disclosed and claimed in the aforesaid copending application an A-C motor wherein the number of poles in the stator and wound rotor circuits may be switched to provide low and high speeds and the torque-speed characteristics can be further controlled between the selected high and low operating speeds. In such a construction, a plurality of brushes are used to contact the rotor slip rings and where, for example, the winding connections are switched from parallel star producing low speed operation to series delta producing high speed operation, six slip rings and brushes are used. When the windings are switched to series delta or high speed operation there is no current present in three of the slip rings and associated brushes. This can create problems in that the nonconducting brushes would be in contact with the rotating slip rings and because they were nonconducting, there would be no filming therebetween and the brushes have a tendency to wear out more rapidly.

Accordingly, it is a general aim of the present invention to provide a brush and slip ring assembly which overcomes the foregoing disadvantage and which is characterized by its ability to eliminate extreme brush wear on nonconducting brushes when the motor is operating at high speeds.

It is a related object to provide a brush and slip ring assembly which enables the motor to be run at high speeds without using a special expensive material for non-current conducting brushes.

It is still another object to provide a brush and slip ring assembly having means for moving non-current carrying brushes out of contact with their respective slip rings for high speed motor operations. In this respect it is a related object to provide for such movement by a means which is operated and controlled by the same mechanism that changes the speed of the motor.

Other objects and advantages of the invention will become apparent upon reading the following detailed discussion and upon reference to the attached drawings, in which:

FIGURE 1 is an elevation view of an exemplary motor and control mechanism embodying the features of the present invention, such apparatus here shown in the high speed, reversing position;

FIG. 2 is a fragmentary, front end view, partially in section, taken along the line 2—2 in FIG. 1;

FIG. 3 is a longitudinal section taken along the line 3—3 in FIG. 2, showing electrical controls schematically;

FIG. 4 is a diagram of one form of electrical circuit for use with the stators of the motor of FIG. 1;

FIG. 5 is a schematic diagram of one form of electrical circuit for use with the rotor of the motor of FIG. 1;

Figure 6:
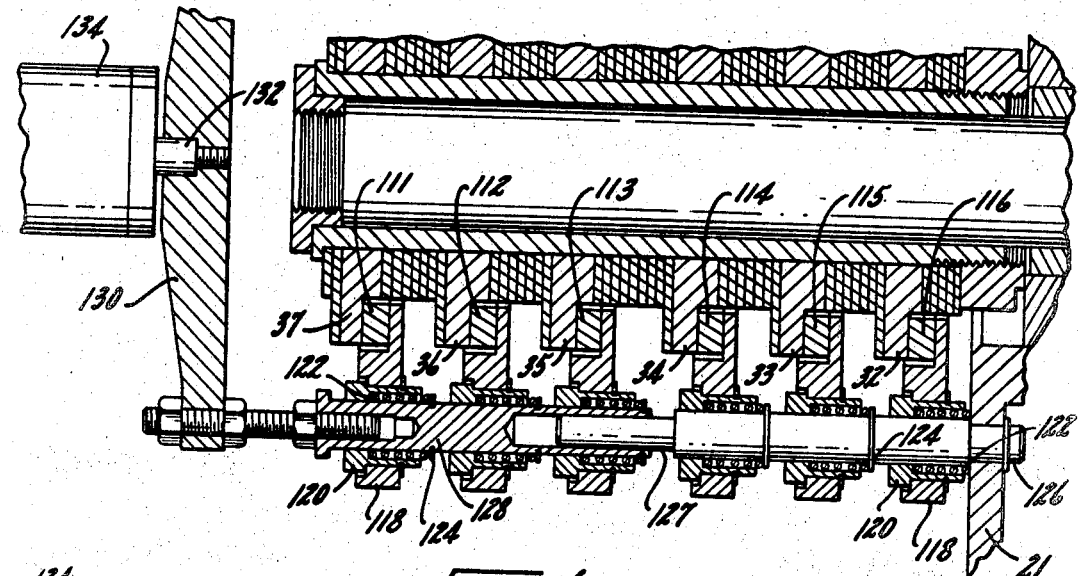
FIG. 6 is an enlarged fragmentary section of the brush and slip ring portion of the motor illustrated in FIG. 1 and illustrating all of the brushes in contact with their respective slip rings.

While the invention has been susceptible of various modifications and alternative forms, a specific embodiment thereof has been shown by way of example in the drawings which will herein be described in detail. It should be understood, however, that it is not intended to limit the invention to the particular form disclosed, but, on the contrary, the intention is to cover all modifications, equivalents, and alternatives falling within the spirit and scope of the invention as expressed in the appended claims.

Referring now to the drawings, there is shown a motor 20 having a frame which consists of a pair of cup-shaped members 21, 22 connected together to define a cylindrical housing. Extending axially through the housing is a rotor shaft 25 mounted in suitable bearings 26.

Secured to the shaft 25 is a rotor assembly indicated generally at 28 which, in the present instance, includes two portions 29, 30. Engaging both portions of the rotor is a winding 31, of "wound" type which is brought out to slip rings 32–37, inclusive. A cup-shaped enclosure member 39 secured to the left-hand housing member 21, as viewed in FIG. 1 is provided to enclose the slip rings. Spaced side by side in the frame and aligned with the portions 29, 30, of the rotor are stator assemblies, 40, 41, having windings 42, 43.

Referring to FIGS. 1 and 3, conjointly, the stator assemblies 40, 41 are, respectively, telescoped over the rotor portions 29, 30 so that the rotating magnetic fields generated by the stator assemblies induces current in their respective rotor portions, creating a secondary rotor field with the interaction of the stator field and the secondary rotor field producing the rotation and torque of the motor. Each of the stator assemblies is rockably supported within the housing 20, and are supported by suitable bearings, which in the present instance includes balls 45 which ride in annular grooved members 46 secured to the stators and grooves 47 formed on the inside of the housing members 21, 22.

For the purpose of rotating the stator assemblies, there is provided a pair of arms 50, 51, connected to the stator assemblies, 40, 41, respectively, and extending radially outward through slots 53, 54 provided in the motor housing. The arms 50, 51 permit the application of rotational movement to the stators 40, 41 respectively, for positioning of the stators with respect to one another in order to adjust the electrical phase relation between the voltages induced by the stators in the rotor winding. That is, the stators may be oriented with respect to one another to produce a null phase and cancel one another so that the torque applied to the rotor is zero, the stators may be adjusted to a position in which the induced voltages are additive for the production of maximum torque, or the stators can be adjusted for any of an infinite number of resultant voltages between the maximum and null phase positions.

In carrying out the present invention means are provided for selectively controlling the speed of the motor by switching the number of poles in the stator and wound rotor circuits to provide, for example, low and high speeds of 900 and 1800 r.p.m. for eight and four poles, respectively, or 600 and 1200 r.p.m., utilizing twelve and six poles, respectively. Thus, referring to FIGS. 3 and 4, the latter showing the stator windings diagrammatically, wherein the stator units 40, 41 receive, respectively, the stator windings 42, 43, and the terminals of which are connected by disconnect switches 57, 58, lead to a source of polyphase voltage, shown for convenience as a three-phase source, indicated at 62. Each of the stators have six leads 64, 65, leading to the terminals of the respective stator windings. The leads 64 and 65 are so arranged that with the voltages applied from the source 62, the rotating fields produced by the stator windings are in like directions of rotation. With stator winding connections as shown in FIGS. 3 and 4, closing switches 58 results in a series delta connection for a high speed setting wherein, for example, six poles are obtained in each of the stators. To change the speed of the motor to low speed, with switches 58 open, switches 57 are closed and a short circuit stator switch 67 is closed across leads to switches 58 to change the winding connection to parallel star whereby twice the number of poles or in this instance twelve poles are obtained. It should be noted that with one winding utilized on each stator, a salient pole connection is utilized to obtain the lower number of poles while a consequent pole connection results for the higher number of poles. Moreover, the number of poles may be varied to have different high and low motor speed settings in accordance with known A-C motor practice.

Turning to the rotor winding connections, since in the preferred embodiment a wound rotor is utilized, it is necessary to switch the rotor winding to obtain the same number of poles as are on each stator. The rotor windings pass through both portions of the rotor 29, 30 to corresponding slip rings 32 through 37 inclusive. The slip rings receive brushes 70 which are connected to auxiliary resistors shown at 71 for adjustment of the speed torque characteristics and which enable high torque to be achieved under starting conditions with the energy of slip dissipated in the form of heat safely outside of the motor. The brushes associated with slip rings 32 through 37, inclusive, are connected to the resistors through contact switches 75, 76.

Turning to the exemplary motor control arrangement, means are provided for moving the two stators in opposite directions from the null phase position, upon positioning by a control member, and including provision for changing the neutral position of the stators so that the stator movement is increased and decreased at the high speed and low speed motor poling connections respectively.

As is illustrated in FIGS. 1 and 2, there is provided a centrally pivoted lever 81 having a first end 82 which is connected to the stator arm 50 via an eye bolt connector member 83, and a second end 84 connected to the stator arm 51 via an eye bolt connection member 85. The lever 81 is centrally pivoted about a link 86 by pin 87, and the link 86 is secured to a fixed surface 88 which may, for example, be a vehicle frame or the motor housing. With the pivoted lever 81 having its ends connected to the stators and its neutral point anchored to a fixed support, the two stators are constrained to move equally in an opposite direction and substantially all of the reaction torque of the stators will be absorbed for easier control of the lever position.

Manually controlled means are provided for tilting the pivoted lever 81 so that the stators are adjustably rotated with respect to one another at each selected motor speed setting to produce either a null condition in which the induced voltages are opposite in phase and cancel one another or a net induced voltage in the rotor winding for production of an output torque. In the illustrated form of the invention, the positioning control includes a manually controlled lever 90 which is secured to a quadrant gear 91, rotatably mounted on a fixed support 93. The quadrant gear 91 meshes with a gear 94 secured to a rotatable link 95 which, in turn, is attached to a positioning link 96. For the purpose of providing easier operation of the manually controlled lever 90, a fluid control booster cylinder 98 is provided with the booster being actuated by link 96. One end of the booster cylinder 98a is pivotally secured to the mounting frame 93, while the opposite end 98b is connected to the pivoted stator lever via pin and slot arrangement, the purpose of which will become apparent as the discussion proceeds.

As shown in FIG. 1, the stators 40, 41 are so phased with respect to one another that when the arms 50, 51 occupy lower and upper positions 50a, 50b and 51a, 51b in slots 53, 54 respectively, and with the motor switch 80 in a high speed setting position, the stators define a "null" condition in which the induced voltages are opposite in phase and cancel one another. In order to achieve "forward," "neutral" and "reverse" operation of the motor when the control lever 90 is placed at the respective settings, a reversing contactor 100, FIG. 4, is interposed between the three-phase supply line 62 and the two leads connected to the stators. The reversing contactor 100 is shown in the form of a switch 102 (FIG. 1) having a plunger 103. A cam surface 104 secured to the gear 94 on link 95 controls the reversing contactor such that forward rotation of the motor is obtained when the lever 90 is moved in one direction from "neutral," and "reverse" operation is obtained when the quadrant lever is moved in the opposite direction.

In accordance with the present invention, a plurality of brushes 111 through 116 inclusive, are illustrated in FIG. 6, spaced along both sides of an axis parallel to the rotor shaft so that there is one brush contacting each slip ring in a one-to-one correspondence. All the brushes are mounted on or attached to brush holders 118, which in turn are retained on rings 120 by washers. For convenience, only the structure of the brushes and brush holders shown at the lower portion of FIG. 3 will be discussed. Those illustrated at the upper portion of the figure are identical. In order to provide an axial bias, each ring has a well in which a spring 122 is seated, to press against rings 124 which are fixed to shafts 126 and 128. In carrying out one of the important aspects of the present invention, means are provided for relatively moving one group of brushes away from its associated slip rings at high speed operation where both groups of brushes and slip rings are not current conducting. To this end, the rings 124 for brushes 114–116 are journaled for limited axial movement on a shaft 126, while those for brushes 111–113 are journaled on a shaft 128. Shaft 126 is fixed to housing 21 while shaft 128 telescopes at one end onto the end 127 of shaft 126. In order to move shaft 128, its other end is bolted to a yoke 130, which is attached to a piston 132, a part of a fluid cylinder 134.

Figure 7:
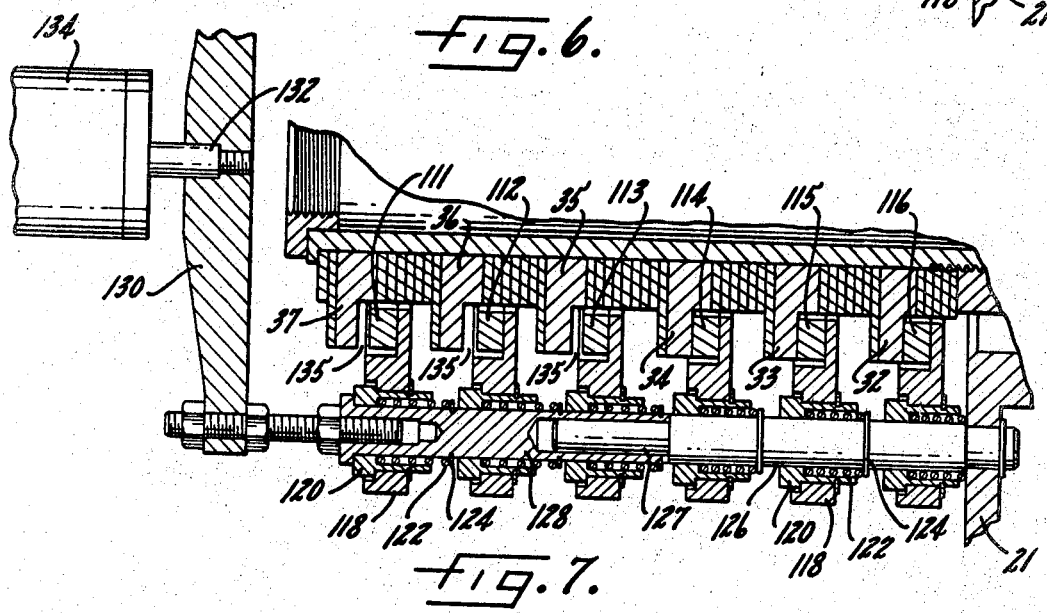
FIG. 7 is a section similar to that of FIG. 6, but with one group of brushes moved out of contact with their respective slip rings.

At low speed operation all the brushes contact the slip rings, and gradual wear that customarily occurs is accommodated by the force of the compressed springs 122. During high speed operation, no current flows through brushes 111–113. In order to prevent rapid wear of these brushes because of the lack of "filming," yoke 130 is moved to the right, as viewed in FIG. 6, so that shaft 128 further telescopes over the end 127 of shaft 126. This serves to remove brushes 111–113 from contact with their associated slip rings by withdrawing their respective brush holders. The gaps 135 shown in FIG. 7 thus prevent destructive wear of the brushes 111–113 during high-speed operation.

For high speed operation of the motor, contacts 75 are closed, while contacts 76 remain open to produce the series delta pole connection in the rotor. When the motor is switched to low speed operation, contacts 75 are opened, contacts 76 are closed, and a short circuit rotor switch 78 is closed to achieve the parallel star winding connection in the rotor. It will be appreciated that the switches 57 and the stator short circuit 67 utilized in conjunction with producing the stator low speed poling, and the switches 76 and rotor short circuit switch 78 utilized in conjunction with the rotory low speed poling, are all controlled by main switch 80. Thus, the motor speed may be simply and easily selected under control of a single speed selection switch 150, with automatic switching to the proper number of poles in the rotor and stators. It will be appreciated that two or more distinct sets of windings may be utilized to change the number of poles for arriving at different selectable speeds.

For the high speed setting, where the lower number of poles are selected, for example, four or six motor poles being utilized, the stator movement for production of full torque is to be twice that of the stator movement for the low speed setting where the higher number of poles, eight or twelve motor poles are utilized.

In accordance with one of the aspects of the present invention, means are provided for automatically shifting the brushes relative to their associated slip rings simultaneously with the motor speed selection control, which increases the stator movement for the high speed setting and decreasing stator movement for the low speed setting. In order to more fully understand this aspect of the present invention, it may be seen referring to FIG. 1 that the "neutral" position of the stators is automatically and correctively adjusted when switching the motor to its high and low speed settings under the control of speed control switch 150. This is accomplished in the present instance by positioning movable end 98b of the booster control along a slot 105 formed in the pivoted stator control lever 81 via an air or hydraulic operated servo 106. The servo 106 consists of a conventional double ended actuator having a plunger 108 connected to the end 98b of the booster 98, via a pin 109. Air or hydraulic fluid is applied to servo 106 via supply lines 154, 155, connected to a double acting solenoid control valve 140, operated by speed control switch 150. Any suitable air or hydraulic system may be utilized to provide fluid pressure to inlet connections 141 for the solenoid control valve 140 and inlet connection 142 for the booster control 98. Suitable discharge leads 143, 145 are provided on the solenoid valve 140 and the booster 98, respectively.

It will be appreciated by one skilled in the art, that, in the alternative, electrical control means rather than hydraulic, can be used to actuate the servo 106 and piston 132.

The operation of the servo control 106 is such that when the control lever 90 is in the "neutral" position and when the motor control switch 150 is in the low speed position, the booster control end 98b occupies the end marked L in the slot 105, and the stator arms are in an aligned position which is the same as the position shown in FIG. 1. Movement of the control lever 90 to the "forward" position tilts the pivot lever so that the stator arm 51 is rotated counterclockwise, as viewed from the left-hand end of the motor. The voltages induced by the stators in the rotor are thus moved into phase alignment, producing progressively increased torque. Moving the control lever 90 back to its "neutral" position serves to brake the motor to a stop and produce rotation of the rotor shaft in the opposite direction. If the control lever 90 passes through the "neutral" position, the reversing switch 102 and cam surface 103 reverse the connections to two of the three supply lines to produce a field which rotates in the opposite direction.

When the speed control switch 80 is thrown to the "high" position, servo control 106 returns the end 98b of the booster to the position H, and with the lever arm 90 in the neutral position, stator arms 50 and 51 occupy upper and lower positions 50a, 50b and 51a, 51b in slots 53, 54 respectively. Movement of the control lever 90 to either the "forward" or "reverse" positions results in movement by stator arm 50 in the counterclockwise direction and stator arm 51 in the clockwise direction, as viewed from the left end of the motor, due to the fact that the links 95 and 102 pass over center, with the result that travel by the stator arms from zero to maximum torque position for high speed operation is twice that of the stator arm movement from zero to maximum torque position for low speed motor operation.

In order to effect simultaneous control of the movement of brushes 111–113 relatively away from slip rings 36–38, the fluid cylinder 134 (FIG. 1) is controlled and operated through leads 156, 157 by the solenoid operated valve 140 which also controls servo 106 for varying the stator neutral position. Thus, when the speed control switch 150 is moved to the high speed setting, stator contacts 58 and rotor contacts 75 are closed, servo 106 adjusts the neutral position of the stators and substantially simultaneously, the brushes 111–113 are moved relatively away from their respective slip rings 36–38. Similarly for low speed operation, moving speed control switch 150 to the low speed setting closes stator contacts 57 and the stator short circuit switch 67, rotor contacts 76 and short circuit switch 78, servo 106 adjusts the stators to the low speed neutral position and substantially simultaneously the brushes 111–113 move into contact with the slip rings 36–38.

It will be appreciated from the foregoing that the present invention is not limited to movement of the brushes toward and away from the slip rings and in the following claims the term "relative movement" is intended to cover either moving the slip rings or the brushes out of contact with one another.

We claim as our invention:

1. A variable speed A-C motor comprising in combination, a frame, first and second stator assemblies on said frame having substantially identical windings for producing rotating fields, each of said stators being rotatably movable in said frame between a null phase relation in which the induced voltages are canceled and an aligned phase relation in which the induced voltages are additive for production of maximum torque, means for switching said stator windings to produce first and second predetermined numbers of winding pole connection, a wound rotor in said frame having windings in which voltages are induced by the stator fields, means for switching said rotor windings to obtain a corresponding number of poles to said stators, a rotor shaft in said housing, means defining a plurality of slip rings mounted on said shaft, means defining first and second groups of brushes mounted for contacting respective ones of said slip rings, said first and second groups of brushes and associated slip rings being current carrying with said first rotor winding pole connections while said first group of brushes and associated slip rings are noncurrent carrying with said second winding pole connection and means for relatively moving said first group of brushes into and out of contact with its respective slip rings so that there is no contact between said first group of brushes and associated slip rings during operation at said second winding pole connection.

2. A variable speed A-C motor comprising in combination, a frame, a stator assembly on said frame having windings for producing rotating fields, means for switching said stator windings to produce first and second predetermined numbers of windings pole connections, a wound rotor in said frame having windings in which voltages are induced by the stator fields, means for switching said rotor windings to obtain a corresponding number of poles to said stator, a rotor shaft in said housing, means defining a plurality of slip rings mounted on said shaft, means defining first and second groups of brushes mounted for contacting respective ones of said slip rings, said first and second groups of brushes and associated slip rings being current carrying with said first rotor winding pole connection while said first group brushes and associated slip rings are noncurrent carrying with said second winding pole connection and means for relatively moving said first group of brushes into and out of contact with its respective slip rings so that there is no contact between said first group of brushes and associated slip rings during operation at said second winding pole connection.

3. In a variable speed A-C motor the combination comprising, a frame, at least one stator assembly on said frame having windings for producing rotating fields, means for switching said stator windings to produce a varied number of poles whereby a series delta connection is produced for high speed operation and a parallel star connection is produced for low speed operation, a rotor in said frame having a set of windings in which voltages are induced by the stator fields, means for switching said rotor windings to obtain a corresponding number of poles to said stators, including a series delta connection and a parallel star connection for high and low speed operation, respectively, a shaft in said housing, means defining a plurality of slip rings mounted on said shaft, means defining first and second groups of brushes mounted for contacting respective ones of said slip rings, said first and second groups of brushes and associated slip rings being current carrying with said parallel star, low speed, pole connections while said first group of brushes and associated slip rings are noncurrent carrying with said series delta high speed, pole connection and means for relatively moving said first group of brushes into and out of contact with its respective slip rings so that there is no contact therebetween during operation at said high speed winding pole connection.

4. A variable speed A-C motor comprising in combination, a frame, a stator assembly on said frame having windings for producing rotating fields, means for switching said stator windings to produce first and second predetermined numbers of windings pole connections, a wound rotor in said frame having windings in which voltages are induced by the stator fields, means for switching said rotor windings to obtain a corresponding number of poles to said stator, a speed selection switch connected to said stator and rotor switching means for simultaneously obtaining the same number of poles in said stator and rotor, a rotor shaft in said housing, means defining a plurality of slip rings mounted on said shaft, means defining first and second groups of brushes mounted for contacting respective ones of said slip rings, said first and second groups of brushes and associated slip rings being current carrying with said first rotor winding pole connection while said first group brushes and associated slip rings are noncurrent carrying with said second winding pole connection and means for relatively moving said first group of brushes into and out of contact with its respective slip rings so that there is no contact between said first group of brushes and associated slip rings during operation at said second winding pole connection said brush moving means being connected to said speed selection switch for simultaneous actuation thereof with the change in the number of winding pole connections.

5. For use with an A-C motor having a stator and a wound rotor with each of the stator and rotor windings, respectively, including means for switching the stator and rotor winding pole connections for producing first and second corresponding numbers of winding poles, the combination comprising a rotor shaft connected to said rotor, a plurality of slip rings attached to said shaft, first and second groups of brushes mounted for contacting respective ones of said slip rings, said first group of brushes and associated slip rings being non-current carrying at one of said stator and rotor winding pole connections while said second group of brushes and associated slip rings are current carrying at said one stator and rotor winding pole connection, and means for relatively moving said first group of brushes out of contact with its associated slip rings during operation at said one winding pole connection.

6. In a motor having a wound rotor and at least one stator, the combination with said rotor and said stator comprising a housing, a rotor shaft within said housing, means for switching the stator and rotor winding pole connections associated with said stator and rotor producing first and second corresponding numbers of winding poles for rotating said shaft at different speeds, a plurality of slip rings attached to said shaft, a first group of brushes, a second group of brushes, means for mounting both said groups of brushes in contact with said slip rings, said first group of brushes and slip rings being non-current carrying at one of said winding pole connections while said second group of brushes and slip rings are current carrying at said one winding pole connection, means for withdrawing said first group of brushes from contact with said rings, during operation at said one winding pole connection and means for controlling said speed differential rotating means, said controlling means also serving to control said withdrawing means.

7. In an A-C motor having a wound rotor and at least one stator, the combination with said rotor and said stator comprising a housing, a rotor shaft within said housing, means associated with said stator and rotor for rotating said shraft at different selectable speeds, a plurality of slip rings spaced axially along said shaft, a first group of brushes, a second group of brushes, means for mounting said second group of brushes in a relatively fixed relation with a portion of said slip rings, means movably telescoped onto said mounting means for mounting said first group of brushes in an axially movable relation with respect to the remainder of said rings, means for moving said movable mounting means from one position to another, and means for controlling said speed differential rotating means and said moving means, so that said first group of brushes contact its respective slip rings when said mounting means is moved to said one position and said first brushes do not contact its respective slip rings when said mounting means is moved to said other position.

8. The combination of claim 7, wherein said telescoped mounting means includes a rod and annular brush rings axially slidable thereon, and said controlling means is a fluid operated valve.

9. In an A-C motor having a wound rotor and at least one stator, the combination with said rotor and said stator comprising a housing, a rotor shaft within said housing, means associated with said stator rotor for rotating said shaft at different selectable speeds, an even number of slip rings and brushes spaced axially along said shaft, the brushes corresponding in number with said rings, a first shaft fixed to the housing, a second shaft having one end in a movable telescoping relation with said first shaft, a yoke attached to the other end of said second shaft, brush holders retained on said first and second shafts to which said brushes are attached, means for axially moving said yoke from one position to another, and means for simultaneously controlling said rotating means and said moving means, whereby said second shaft is telescoped further along said first shaft when said yoke is in said other position.

References Cited

UNITED STATES PATENTS

| | | | |
|---|---|---|---|
| 1,448,377 | 3/1923 | Bethel et al. | 310—243 |
| 1,590,030 | 6/1926 | Hull | 318—214 |
| 1,896,164 | 2/1933 | Chandeysson | 310—243 |
| 2,381,982 | 8/1945 | Nardone | 310—240 |
| 3,280,400 | 10/1966 | Roe | 318—243 |
| 3,290,574 | 12/1966 | Roe | 318—214 |

ORIS L. RADER, *Primary Examiner.*

G. RUBINSON, *Assistant Examiner.*